United States Patent
Itagaki

(10) Patent No.: US 6,423,766 B1
(45) Date of Patent: Jul. 23, 2002

(54) FLAME-RETARDANT POLYCARBONATE RESIN COMPOSITION AND ELECTRICAL AND ELECTRONIC COMPONENTS MADE BY MOLDING THE SAME

(75) Inventor: Hiroshi Itagaki, Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/381,978

(22) PCT Filed: Apr. 21, 1998

(86) PCT No.: PCT/JP98/01824
§ 371 (c)(1),
(2), (4) Date: Oct. 5, 1999

(87) PCT Pub. No.: WO98/50468
PCT Pub. Date: Nov. 12, 1998

(30) Foreign Application Priority Data

May 6, 1997 (JP) .............................................. 9-115456

(51) Int. Cl.[7] .......................... C08L 69/00; C08K 5/523
(52) U.S. Cl. .......................... 524/127; 524/141; 525/67
(58) Field of Search .................................. 524/127, 141

(56) References Cited

U.S. PATENT DOCUMENTS

| | | | |
|---|---|---|---|
| 5,276,077 A | * | 1/1994 | Schwane |
| 5,704,803 A | * | 1/1998 | Oshima |
| 5,723,526 A | * | 3/1998 | Nagasawa |
| 5,837,757 A |   | 11/1998 | Nodera et al. |

FOREIGN PATENT DOCUMENTS

| | | | |
|---|---|---|---|
| JP | 231907 | * | 10/1991 |
| JP | 325553 | * | 11/1992 |
| JP | 228764 | * | 8/1995 |
| JP | 185839 | * | 7/1996 |

* cited by examiner

*Primary Examiner*—David J. Buttner
(74) *Attorney, Agent, or Firm*—Oblon, Spivak, McClelland, Maier & Neustadt, P.C.

(57) ABSTRACT

A flame-retardant polycarbonate resin composition, characterized by comprising a polycarbonate resin (A) and a composite rubbery graft copolymer (B), preferably one obtained by grafting a composite rubber having a structure constituted of 1 to 99 wt. % of a polyorganosiloxane rubber component and 99 to 1 wt. % of a polyalkyl acrylate rubber component, the two components being so interwisted with each other as not to separate from each other, and a mean particle diameter of 0.01 to 0.6 $\mu$m with one or more vinyl monomers, at an (A) to (B) weight ratio of 99:1 to 90:10, and by containing, per 100 parts by weight of the sum total of the components (A) and (B), 0.3 to 1.2 parts by weight (in terms of phosphorus) of a halogen-free phosphoric ester (C) and 0.01 to 1.0 part by weight of polytetrafluoroethylene (D), the weight ratio of the graft copolymer (B) to the phosphorus resulting from the phosphoric ester (C) lying within the range of 2 to 15; and housing of office automation equipment and electrical and electronic appliances and battery packs made by molding the composition. The composition is improved in mechanical properties such as impact resistance, is excellent in moldability and flowability, and exhibits high flame retardance even without resort to any bromine compound.

8 Claims, No Drawings

FLAME-RETARDANT POLYCARBONATE RESIN COMPOSITION AND ELECTRICAL AND ELECTRONIC COMPONENTS MADE BY MOLDING THE SAME

TECHNICAL FIELD

The present invention relates to a flame-retardant polycarbonate resin composition and to electrical and electronic components of housings of office automation equipment, housings of electrical and electronic appliances and battery packs as made by molding the composition. More precisely, it relates to a flame-retardant, non-bromine polycarbonate resin composition having good flame retardancy, good mechanical properties including impact resistance, good flowability and good moldability, and to housings of office automation equipment, housings of electrical and electronic appliances and battery packs as made by molding the composition.

BACKGROUND OF THE INVENTION

As having good mechanical properties (especially high impact resistance), good electric properties, and good transparency, polycarbonate resins are widely used as engineering plastics in various fields of office automation equipment, electrical and electronic appliances, building materials, etc.

Among various thermoplastic resins, polycarbonate resins have a high oxygen index and are generally self-extinguishable. However, especially in the fields of office automation equipment and electrical and electronic appliances, concretely for applications to housings of office automation equipment, to housings of electrical and electronic instruments such as notebook-type personal computers and others, and to battery packs, resin compositions with much more improved flame retardancy are desired to satisfy the requirement for safety operation of those equipment and appliances.

For making resins have flame retardancy, heretofore, flame retardants comprising a bromine compound have been used. One problem with resin compositions that comprise such a bromine-containing flame retardant is that molds used for repeatedly molding the resin compositions are rusted and that the resin compositions being molded are yellowed while in molds. Another problem is that the resin compositions being molded release corrosive gases that may pollute the environment. In that situation, non-bromine flame retardants are being much desired for resin compositions.

On the other hand, office automation equipment and electrical and electronic appliances, concretely, their housings and battery packs are required to have much improved impact resistance. In order to improve the impact resistance of such equipment and appliances, concretely their components, one popular means that has heretofore been generally employed is to add rubbery improvers to polycarbonate resins and to mold the resulting resin compositions. However, this is problematic in that the resin compositions to which is added a large amount of such an impact resistance improver could not have good flame retardancy. For their applications, in particular, battery packs are used for mobile communication appliances such as portable telephones and others or for portable terminals such as notebook-type personal computers and others, and are therefore required to be lightweight and thin-walled. Accordingly, the materials for such battery packs are required to have good moldability and flowability.

Various techniques for those requirements have heretofore been proposed, for example, in JP-A 07-173401, 08-259792, 08-120169, 07-304943, 08-239565, etc. The compositions proposed therein could have flame retardancy in some degree, but are still problematic in that they contain bromine-containing flame retardants, or if not containing bromine-containing flame retardants, their mechanical properties such as impact resistance and also their moldability and flowability are poor.

The object of the invention is to provide a polycarbonate resin composition having improved mechanical properties such as impact resistance, having good moldability and flowability and having good flame retardancy even though not containing a bromine compound, and to provide housings of office automation equipment, housings of electrical and electronic appliances and also battery packs as made by molding the composition.

DISCLOSURE OF THE INVENTION

Given that situation, we, the present inventors have assiduously studied, and, as a result, have found that the object can be attained by adding a composite rubbery graft copolymer to a polycarbonate resin, preferably by adding a specific composite rubbery graft copolymer, a halogen-free phosphoric ester and a polytetrafluoroethylene thereto in a specific ratio of the composite rubbery graft copolymer to the halogen-free phosphoric ester.

The invention has been completed on the basis of these findings.

Specifically, the invention provides a polycarbonate resin composition, and housings of office automation equipment, housings of electrical and electronic appliances, and battery packs as made by molding the composition, which are as follows:

(1) A flame-retardant polycarbonate resin composition comprising (A) a polycarbonate resin and (B) a composite rubbery graft copolymer in a ratio by weight, (A):(B), falling between 99:1 and 90:10, and containing, relative to 100 parts by weight of the sum total of the component (A) and the component (B), (C) from 0.3 to 1.2 Darts by weight. in terms of phosphorus. of a halogen-free phosphoric ester, and (D) from 0.01 to 1.0 part by weight of a polytetrafluoroethylene, in which the ratio by weight of the amount of the composite rubbery graft copolymer (B) to the phosphorus content of the halogen-free phosphoric ester (C) falls between 2 and 15.

(2) The flame-retardant polycarbonate resin composition of (1), wherein the composite rubbery graft copolymer (B) is prepared by grafting a composite rubber, which has a structure composed of from 1 to 99% by weight of a polyorganosiloxane rubber component and from 1 to 99% by weight of a polyalkyl acrylate rubber components, the two components being so intertwisted with each other as not to separate from each other, and has a mean particle diameter of from 0.01 $\mu$m to 0.6 $\mu$m, with one or more vinyl monomers.

(3) Electrical and electronic components as made by molding the flame-retardant polycarbonate resin composition of (1) or (2).

(4) Housings of office automation equipment, or housings of electrical and electronic appliances, as made by molding the flame-retardant polycarbonate resin composition of (1) or (2).

(5) Battery packs as made by molding the flame-retardant polycarbonate resin composition of (1) or (2).

BEST MODES OF CARRYING OUT THE INVENTION

The invention is described in detail hereinunder.

1. Flame-Retardant Polycarbonate Resin Composition (1) Description of Constituent Components
[i] Polycarbonate Resin (Component (A))

In the flame-retardant polycarbonate resin composition of the invention, the polycarbonate resin for the component (A) may be any and every one that may be prepared in any ordinary method of, for example, reacting a diphenol with a polycarbonate precursor such as phosgene, carbonate compounds, etc. Concretely, it includes polycarbonate resins as prepared through reaction of a diphenol with a carbonate precursor such as phosgene or transesterification of a diphenol with a carbonate precursor such as diphenyl carbonate, in a solvent of methylene chloride or the like in the presence of a known acid acceptor and a known molecular weight-controlling agent, to which is optionally added a branching agent.

For the reaction, various diphenols are employable. Especially preferred is 2,2-bis (4-hydroxyphenyl)propane (this is generally referred to as bisphenol A). As other bisphenols employable herein in addition to bisphenol A, mentioned are bis (hydroxyaryl) alkanes such as bis (4-hydroxyphenyl) methane, 1,1-bis(4-hydroxyphenyl)ethane, 2,2-bis(4-hydroxyphenyl)butane, 2,2-bis(4-hydroxyphenyl)octane, 2,2-bis(4-hydroxyphenyl)phenylmethane, 2,2-bis(4-hydroxy-1-methylphenyl)propane, bis(4-hydroxyphenyl) naphthylmethane, 1,1-bis(4-hydroxy-t-butylphenyl) propane, 2,2-bis(4-hydroxy-3,5-tetramethylphenyl)propane, etc.; bis(hydroxyaryl)cycloalkanes such as 1,1-bis (4-hydroxyphenyl)cyclopentane, 1,1-bis(4-hydroxyphenyl) cyclohexane, 1,1-bis(4-hydroxyphenyl)-3,5,5-trimethylcyclohexane, etc.; dihydroxyaryl ethers such as 4,4'-dihydroxyphenyl ether, 4,4'-dihydroxy-3,3'-dimethylphenyl ether, etc.; dihydroxydiaryl sulfides such as 4,4'-dihydroxydiphenyl sulfide, 4,4'-dihydroxy-3,3'-dimethyldiphenyl sulfide, etc.; dihydroxydiaryl sulfoxides such as 4,4'-dihydroxydiphenyl sulfoxide, 4,4'-dihydroxy-3,3'-dimethyldiphenyl sulfoxide, etc.; dihydroxydiaryl sulfones such as 4,4'-dihydroxydiphenyl sulfone, 4,4'-dihydroxy-3,3'-dimethyldiphenyl sulfone, etc.; dihydroxydiphenyls such as 4,4'-dihydroxydiphenyl, etc. One or more of these diphenols may be used either singly or as combined.

The carbonate compound includes, for example, diaryl carbonates such as diphenyl carbonate, etc.; dialkyl carbonates such as dimethyl carbonate, diethyl carbonate, etc.

As the molecular weight-controlling agent, herein employable is any and every one that may be used in polymerization to give polycarbonates. Concretely mentioned are monophenols which include, for example, phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-n-nonylphenol, m-nonylphenol, p-n-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-di-t-butylphenol, 2,5-dicumylphenol, 3,5-dicumylphenol, p-cresol, etc. Of those monophenols, preferred are p-t-butylphenol, p-cumylphenol, p-phenylphenol, etc.

As the branching agent, for example, employable are compounds having at least three functional groups, such as 1,1,1-tris(4-hydroxyphenyl)ethane, α, α', α"-tris(4-hydroxyphenyl)-1,3,5-triisopropylbenzene, 1-[α-methyl-α-(4'-hydroxyphenyl)ethyl]-4-[α', α'-bis(4"-hydroxyphenyl) ethyl]benzene, phloroglucinol, trimellitic acid, isatinbis(o-cresol), etc.

In general, the polycarbonates for use in the invention preferably have a viscosity-average molecular weight of from 10,000 to 100,000, more preferably from 14,000 to 40,000.

[ii] Composite Rubbery Graft Copolymer (Component (B))

The composite rubbery graft copolymer of the component (B) is one as prepared by grafting a composite rubber with one or more vinyl monomers. Preferably, it is prepared by grafting a composite rubber, which has a structure composed of from 1 to 99% by weight of a polyorganosiloxane rubber component and from 1 to 99% by weight of a polyalkyl acrylate rubber components, the two components being so intertwisted with each other as not to separate from each other, and has a mean particle diameter of from 0.01 $\mu$m to 0.6 $\mu$m, with one or more vinyl monomers.

The composite rubbery graft copolymer may be produced in any known manner, for example, according to the methods described in JP-A64-79257 and 1-190746. For producing it, for example, a polyorganosiloxane rubber latex is first prepared, and monomers for polyalkyl (meth)acrylate rubbers are infiltrated into rubber particles in the polyorganosiloxane rubber latex, and then polymerized in the rubber particles.

The polyorganosiloxane rubber may be prepared by mixing a linear organosiloxane such as dimethylsiloxane or the like with from 0.1 to 30% by weight of a polyfunctional, silane-based crosslinking agent such as trimethoxymethylsilane, tetraethoxysilane or the like, and polymerizing them in emulsion.

For the latex production, usable is the method disclosed in U.S. Pat. No. 2,891,920. According to the method, the emulsion polymerization may be effected by mixing the components noted above in water, in the presence of a sulfonic acid-based emulsifier such as an alkylbenzenesulfonic acid, an alkylsulfonic acid or the like, which acts also as a polymerization initiator, for example, in a homogenizer.

The resulting polyorganosiloxane rubber latex is then neutralized with an aqueous alkali solution of sodium hydroxide or the like, to which are added an alkyl (meth) acrylate such as methyl acrylate, n-butylacrylate or the like, a crosslinking agent such as ethylene glycol dimethacrylate or the like, and a grafting reaction promoter such as allyl methacrylate or the like. In that condition, those additives are infiltrated into the polyorganosiloxane rubber particles. Next, an ordinary radical polymerization initiator is added thereto, and the monomers are polymerized to give a composite rubber latex in which the crosslinked polyalkyl (meth) acrylate rubber structure formed is intertwisted with the crosslinked polyorganosiloxane rubber structure so that the two rubber components are substantially unseparable.

To the composite rubber latex, added are vinyl monomers (e.g., alkenyl aromatic compounds such as styrene, etc.; methacrylates such as methyl methacrylate, etc.; acrylates such as methyl acrylate, etc.; vinyl cyanides such as acrylonitrile, etc.), and these are radical-polymerized in a single-stage or multi-stage polymerization manner. Then, calcium chloride or the like is added to the resulting latex for salting out to obtain the intended, composite rubbery graft copolymer through solidification and isolation.

[iii] Halogen-Free Phosphoric Ester (Component (C))

The halogen-free phosphoric ester of the component (C) for use in the invention does not contain a halogen atom such as bromine or the like. Therefore, the scrap of the moldings of the composition of the invention pollutes little the environment.

The halogen-free phosphoric ester includes, for example, monophosphates or polyphosphates of the following general formula (I):

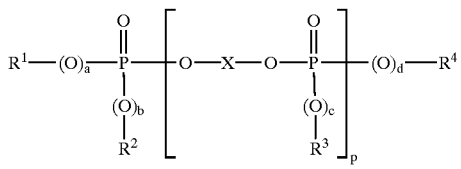

In formula (I), $R^1$ to $R^4$ each independently represent an optionally-substituted aryl group, and these may be the same or different; X represents an optionally-substituted arylene group; a, b, c and d each represent 0 or 1; and p represents an integer of from 0 to 5. Where two or more phosphates are used, as combined, p in formula (I) shall be the average of p in plural phosphates. The substituents for the aryl and arylene groups include, for example, an alkyl group having from 1 to 10 carbon atoms, an alkoxy group having from 1 to 10 carbon atoms, an aryl group such as phenyl, tolyl, etc. The aryl and arylene groups may have one or more substituents.

Specific examples of the halogen-free phosphates of formula (I) include monophosphates such as triphenyl phosphate, tricresyl phosphate, trixylenyl phosphate, tribiphenyl phosphate, etc.; and polyphosphates such as phenyl-resorcinol polyphosphate, phenyl-hydroquinone polyphosphate, phenyl-cresyl-resorcinol polyphosphate, phenyl-cresyl-hydroquinone polyphosphate, tetraphenyl-resorcinol diphosphate, tetraphenyl-hydroquinone diphosphate, phenyl-tricresyl-resorcinol diphosphate, phenyl-tricresyl-hydroquinone diphosphate, tetrabiphenyl-resorcinol diphosphate, tetrabiphenyl-hydroquinone diphosphate, etc. Of those, preferred are polyphosphates, as being effective for preventing the polycarbonate resin composition comprising them from adhering to molds and from soiling molds while the composition is thermally molded. One or more of these monophosphates and polyphosphates may be used either singly or as combined.

[iv] Polytetrafluoroethylene (Component (D))

Polytetrafluoroethylene (PTFE) of the component (D) is to prevent the polycarbonate resin composition comprising it from melting and dripping and to make the composition have good flame retardancy. Therefore, PTFE with good fibrillating ability is preferably used.

The fibrillating ability of PTFE is meant to indicate that PTFE could fibrillate after having received shear stress of plasticization while the composition comprising it is kneaded or molded through injection, and this brings about high flame retardancy of the moldings of the composition.

PTFE with such fibrillating ability for use in the invention is not specifically defined. For example, preferred are those that are grouped in Type 3 in the ASTM standard. As specific examples of commercially-available products of PTFE grouped in Type 3, mentioned are Teflon 6-J (trade name, from Mitsui-DuPont Fluorochemical), Polyflon TFE D-1 (trade name, from Daikin Industry), Polyflon TFE F-104 (trade name, from Daikin Industry), etc. As others not in Type 3 but are employable herein, for example, mentioned are Algoflon F5 (trade name, fromMontefluos), Polyflon-MPA FA-110 and Polyflon TFE F201 (both trade names, from Daikin Industry), etc.

Two or more of those PTFEs maybe used, as combined. PTFEs with fibrillating ability such as those mentioned above may be prepared, for example, by polymerizing tetrafluoroethylene in an aqueous medium in the presence of sodium, potassium or ammonium peroxydisulfide, under a pressure falling between 1 and 100 psi and at a temperature falling between 0 and 200° C., preferably between 20 and 100° C.

(2) Proportions of Constituent Components

[i] Regarding the proportions of the polycarbonate resin (A) and the composite rubbery graft copolymer (B), the ratio by weight of (A) to (B) falls between 99:1 and 90:10, but preferably between 99:1 and 92:8. With the proportion of the composite rubbery graft copolymer being at least 1 in terms of the ratio noted above, the moldings of the composition could have satisfactory impact resistance. However, if the proportion of the composite rubbery graft copolymer is larger than 10 in terms of that ratio, a large amount of the flame retardant must be added to the composition in order not to lower the flame retardancy of the composition. If so, the impact resistance of the moldings of the composition will lower. With the proportion of the polycarbonate resin being at least 90 in terms of the ratio noted above, the composition well exhibits the properties of polycarbonates.

[ii] Regarding the proportion of the halogen-free phosphoric ester of the component (C), the amount of the component (C) is from 0.3 to 1.2 parts by weight relative to 100 parts by weight of the sum total of the component (A) and the component (B). The component (C) exhibits a synergistic effect for improving the flowability of the composition, and is effective for preventing the moldings of the composition from having silver marks. If the amount of the component (C) is smaller than 0.3 parts by weight, the composition could not have satisfactory flame retardancy; and if larger than 1.2 parts by weight, the composition will lose the characteristics of polycarbonates, in particular, the impact resistance of the moldings of the composition will be poor. Therefore, adding the component (C) to the composition in an amount overstepping the defined range is unfavorable.

[iii] Regarding the proportion of the polytetrafluoroethylene of the component (D), the amount of the component (D) is from 0.01 to 1.0 part by weight relative to 100 parts by weight of the sum total of the component (A) and the component (B). If the amount of the component (D) is smaller than 0.01 parts by weight, the composition could not have satisfactory flame retardancy and its anti-dripping property will be poor. However, even if the amount of the component (D) is larger than 1.0 part by weight, such a large amount of the component (D) added could not produce any additional effect but is rather unfavorable in a sense of economy.

[iv] Regarding the relationship between the phosphorus content of the halogen-free phosphoric ester of the component (C) and the amount of the composite rubbery graft copolymer of the component (B), it is necessary that the ratio by weight of the amount of the composite rubbery graft copolymer (B) to the phosphorus content of the halogen-free phosphoric ester (C), or that is, [amount of the composite rubbery graft copolymer (B)/phosphorus content of the halogen-free phosphoric ester (C)] falls between 2 and 15. Within the defined range, the composition could have well-balanced physical properties. If the weight ratio is smaller than 2, the moldings of the composition could not have satisfactory impact resistance; and if larger than 15, they could not have satisfactory flame retardancy.

(3) The resin composition of the invention may optionally contain, in addition to the components (A), (B), (C) and (D) noted above, various inorganic fillers, additives and other synthetic resins, within the range not interfering with the object of the,invention.

For example, inorganic fillers may be added to the polycarbonate resin composition for the purpose of improving the mechanical strength and the durability of the composition. As specific examples of the inorganic fillers, mentioned are glass fibers, carbon fibers, glass beads, glass flakes, carbon flakes, carbon black, calcium sulfate, calcium carbonate, calcium silicate, titanium oxide, alumina, silica, asbestos, talc, clay, mica, quartz powder, etc. The additives include, for example, antioxidants such as hindered phenols, phosphorus compounds (phosphites, phosphates, etc.), amines, etc.; ultraviolet absorbents such as benzotriazoles, benzophenones, etc.; external lubricants such as aliphatic carboxylates, paraffins, silicone oils, polyethylene waxes, etc.; as well as mold-releasing agents, antistatic agents, colorants, etc. Other resins that may be added to the composition of the intention include, for example, polyethylenes, polypropylenes, polystyrenes, AS resins, ABS resins, polymethyl methacrylates, etc.

(4) Formulation and Kneading of Constituent Components, and Molding of the Resulting Composition Formulation and kneading of the constituent components is not specifically defined, for which is employable any ordinary method. For example, employable are any of ribbon blenders, Henschel mixers, Banbury mixers, drum tumblers, single-screw extruders, double-screw extruders, co-kneaders, multi-screw extruders, etc. For kneading the components, the heating temperature may be any ordinary one, for example, falling between 240 and 340° C.

The polycarbonate resin composition thus produced may be molded in various known molding methods of, for example, injection molding, blow molding, extrusion molding, compression molding, calender molding, rotary molding or the like. In particular, the composition is suitable to producing moldings in the fields of office automation equipment and electrical and electronic appliances, concretely, to producing housings of office automation equipment and electrical and electronic appliances such as notebook-type personal computers, etc., and battery packs of office automation equipment and mobile communication appliances such as portable telephones, cellular phone etc.

EXAMPLES

The invention is described in more detail with reference to the following Examples, which, however, are not intended to restrict the scope of the invention.

(1) The materials used in examples and comparative examples are mentioned below.

(A) Polycarbonate (PC resin):

Toughlon FN1900A (trade name, from Idemitsu Petrochemical; this is bisphenol A-type polycarbonate having a viscosity-average molecular weight of 19000).

(B) Composite rubbery graft copolymer:

Metablen S-2001 (trade name, from Mitsubishi Rayon; this is methyl methacrylate-alkyl acrylate-dimethylsiloxane copolymer).

(C) Halogen-free phosphoric esters:

[i] Adekastab PFR (trade name, from Asahi Denka Kogyo; this is phenyl-resorcinol polyphosphate having a phosphorus content of 10.8% by weight).

[ii] PX-200 (trade name, from Daihachi Chemical Industry; this is 2,6-dimethylphenyl-resorcinol polyphosphate having a phosphorus content of 9.0% by weight).

(D) Polytetrafluoroethylene:

Algoflon F5 (trade name, from Montefluos).

(E) Bromine-containing flame retardant:

BC-52 (trade name, from Greatlakes), hereinafter referred to as BC-52.

(2) The properties of the oolycarbonate resin compositions produced are evaluated according to the methods mentioned below.

(a) Izod Impact Strength Test

According to JIS K7110, test pieces are tested at −10° C. Of 10 test pieces, the number of those not with brittle fracture but with ductile fracture is counted, from which is obtained the percent ductile fracture (%) of the test pieces. The percent ductile fracture is the index of the impact resistance of the material tested. Specifically, the impact resistance of the material tested is based on the mode of fracture of the test pieces of the material, as to whether the test pieces having been tested in the Izod test have ductile fracture or brittle fracture. The material having a higher percent ductile fracture has higher impact resistance.

(b) Flame Retardancy

The flame retardancy is measured in a vertical combustion test according to the UL 94 (Underwriters Laboratories Standards, Subject 94), in which are tested test pieces having a thickness of 0.8 mm.

(c) Flowability

The flow ability is measure data temperature of 280° C. under a load of 160 kg/cm$^2$, according to JIS K7210.

(d) In-Mold Thermal Stability

Using a molding machine (IS-25EP from Toshiba Machine), the in-mold thermal stability is measured at a settled temperature of 300° C. for a residence time of 20 minutes. The samples tested are evaluated as follows:

S: Silver marks found.

○: No change.

(e) Gas Generation in Molding

Using a molding machine (IS-25EP from Toshiba Machine), samples are continuously molded at a settled molding temperature of 300° C. The gas generation, if any, during the molding is checked visually.

Much: Much gas generated.

Little: Little gas generated.

Examples 1 and 2, Comparative Examples 1 to 6

Table 1 shows the components and their amounts used herein. Using a 35-mmΦ double-screw extruder at a cylinder temperature of 280° C. and a screw revolution of 100 rpm, the indicated amounts of the components were melt-kneaded and extruded out into pellets. The resulting pellets were dried at 100° C. for 5hours, and then injection-molded at an injection temperature of 280° C. into test pieces for measurement of physical properties.

The data of the properties of the resin compositions are shown in Table 1.

TABLE 1

|  |  | Examples | | Comparative Examples | | | | | |
|---|---|---|---|---|---|---|---|---|---|
|  |  | 1 | 2 | 1 | 2 | 3 | 4 | 5 | 6 |
| Components | (A) Polycarbonate resin (wt. %) | 96 | 94 | 94 | 100 | 85 | 99 | 95 | 100 |
|  | (B) Composite rubbery graft copolymer (wt. %) | 4 | 6 | 6 | 0 | 15 | 1 | 5 | 0 |

The amounts of (C), (D) and (X) are parts by weight relative to 100 parts by weight of (A) + (B).

TABLE 1-continued

|  |  | Examples | | Comparative Examples | | | | | |
|---|---|---|---|---|---|---|---|---|---|
|  |  | 1 | 2 | 1 | 2 | 3 | 4 | 5 | 6 |
|  | (C) Halogen free phosphoric ester (1) (phosphorus content) | 7 (0.76) | 0 | 0 | 7 (0.76) | 0 | 10 (1.08) | 7 (0.76) | 7 (0.76) |
|  | (C) Halogen free phosphoric ester (2) (phosphorus content) | 0 | 7 (0.63) | 0 | 0 | 7 (0.63) | 0 | 0 | 0 |
|  | (D) Polytetrafluoroethylene | 0.5 | 0.3 | 0.5 | 0.3 | 0.3 | 0.5 | 0 | 0 |
|  | (X) Bromine containing flame retardant | 0 | 0 | 15 | 0 | 0 | 0 | 0 | 0 |
|  | Ratio by weight of amount of (B)/phosphorus content of (C) | 5.3 | 9.5 | — | 0 | 23 | 0.9 | 6.6 | 0 |
| Evaluation | Percent ductility fracture (%) in Izod impact test | 100 | 100 | 100 | 0 | 100 | 0 | 100 | 0 |
|  | UL94, 0.8 mm, class V-O | passed | passed | passed | passed | failed | passed | failed | failed |
|  | Flowability (Q value) | 22 | 21 | 10 | 25 | 23 | 25 | 23 | 24 |
|  | In-mold thermal stability | ○ | ○ | S | ○ | ○ | ○ | ○ | ○ |
|  | Gas generation in molding | little | little | much | little | little | little | little | little |

As is known from Table 1, the samples of Examples 1 and 2 both have high-level flame retardancy, and have good impact resistance, good flowability and good moldability.

As opposed to those, the sample of Comparative Example 1 containing the bromine-containing flame retardant has poor flowability and poor moldability, and generated much gas while being molded. The sample of Comparative Example 2 not containing the composite rubbery graft copolymer, has low impact resistance. In Comparative Example 3, the ratio by weight of the amount of the composite rubbery graft copolymer (B) to the phosphorus content of the halogen-free phosphoric ester (C) is larger than 15, (that is, the proportion of the phosphorus compound is small). Therefore, the sample of Comparative Example 3 failed in the flame retardancy test. In Comparative Example 4, the weight ratio of (B) to (C) is smaller than 2, (that is, the proportion of the composite rubbery graft copolymer is small). Therefore, the sample of Comparative Example 4 has poor impact resistance. The sample of Comparative Example 5 not containing polytetrafluoroethylene failed in the flame retardancy test. The sample of Comparative Example 6 not containing the composite rubbery graft copolymer has poor impact resistance, and, in addition, not containing polytetrafluoroethylene, this failed in the flame retardancy test.

Industrial Applicability

The flame-retardant polycarbonate resin composition of the invention has good moldability and good flowability while having good mechanical properties including impact resistance, and, addition, even not containing a bromine compound, it has excellent flame retardancy. Therefore, the composition is especially suitable to moldings in the fields of office automation equipment and electrical and electronic appliances, concretely, for housings of office automation equipment and electrical and electronic appliances, such as notebook-type personal computers and others, and also for battery packs.

What is claimed is:

1. A flame-retardant polycarbonate resin composition comprising (A) a polycarbonate resin and (B) a composite rubber graft copolymer in a ratio by weight, (A):(B), falling between 99:1 and 92:8, and containing, relative to 100 parts by weight of the sum total of the component (A) and the component (B), (C) from 0.3 to 1.2 parts by weight, in terms of phosphorus, of a halogen-free phosphoric ester, and (D) from 0.01 to 1.0 part by weight of a polytetrafluoroethylene, in which the ratio by weight of the amount of the composite rubbery graft copolymer (B) to the phosphorus content of the halogen-free phosphoric ester (C) falls between 2 and 15, wherein the composite rubbery graft copolymer (B) is prepared by grafting a composite rubber, which has a structure composed of from 1 to 99% by weight of a polyorganosiloxane rubber component and from 1 to 99% by weight of a polyalkyl acrylate rubber components, the two components being so intertwisted with each other as not to separate from each other, and has a mean particle diameter of from 0.01 μm to 0.6 μm, with one or more vinyl monomers, wherein said composition contains essentially no inorganic filler and essentially no ABS resin.

2. Electrical and electronic components as made by molding the flame-retardant polycarbonate resin composition of claim 1.

3. Housings of office automation equipment, or housings of electrical and electronic appliances, as made by molding the flame-retardant polycarbonate resin composition of claim 1.

4. Battery packs as made by molding the flame-retardant polycarbonate resin composition of claim 1.

5. A flame-retardant polycarbonate resin composition consisting essentially of (A) a polycarbonate resin and (B) a composite rubber graft copolymer in a ratio by weight, (A):(B), falling between 99:1 and 92:8, and containing, relative to 100 parts by weight of the sum total of the component (A) and the component (B), (C) from 0.3 to 1.2 parts by weight, in terms of phosphorus, of a halogen-free phosphoric ester, and (D) from 0.01 to 1.0 part by weight of a polytetrafluoroethylene, in which the ratio by weight of the amount of the composite rubbery graft copolymer (B) to the phosphorus content of the halogen-free phosphoric ester (C) falls between 2 and 15, wherein the composite rubbery graft copolymer (B) is prepared by grafting a composite rubber, which has a structure composed of from 1 to 99% by weight of a polyorganosiloxane rubber component and from 1 to 99% by weight of a polyalkyl acrylate rubber components, the two components being so intertwisted with each other as not to separate from each other, and has a mean particle diameter of from 0.01 μm to 0.6 μm, with one or more vinyl monomers, wherein said composition contains essentially no inorganic filler and essentially no ABS resin.

6. Electrical and electronic components as made by molding the flame-retardant polycarbonate resin composition of claim 5.

7. Housings of office automation equipment, or housings of electrical and electronic appliances, as made by molding the flame-retardant polycarbonate resin composition of claim 5.

8. Battery packs as made by molding the flame-retardant polycarbonate resin composition of claim 5.

* * * * *